United States Patent [19]

Barnes

[11] 3,739,537
[45] June 19, 1973

[54] AIRCRAFT HANGAR
[75] Inventor: William A. Barnes, Hamilton, Ontario, Canada
[73] Assignee: H. H. Robertson Company, Pittsburgh, Pa.
[22] Filed: May 20, 1971
[21] Appl. No.: 145,202

[30] Foreign Application Priority Data
July 15, 1970 Canada .................................. 88,334

[52] U.S. Cl. ......................... 52/64, 52/79, 52/143, 52/237
[51] Int. Cl. ......................... E04b 1/342, E04h 6/44
[58] Field of Search .................. 52/64, 67, 79, 143, 52/237

[56] References Cited
UNITED STATES PATENTS
| | | | |
|---|---|---|---|
| 3,034,607 | 5/1962 | Haines | 52/64 |
| 2,992,709 | 7/1961 | McIntosh | 52/79 |
| 2,652,906 | 9/1953 | Mitchell | 52/79 |
| 2,420,186 | 5/1947 | Miller et al. | 52/64 |
| 2,245,318 | 6/1941 | Blank | 52/64 |
| 1,594,080 | 7/1926 | Thies | 52/64 |
| 3,543,455 | 12/1970 | Walsh | 52/64 |
| 3,543,461 | 12/1970 | Davidson | 52/237 |

FOREIGN PATENTS OR APPLICATIONS
| | | | |
|---|---|---|---|
| 25,017 | 8/1910 | Great Britain | 52/64 |
| 684,494 | 12/1952 | Great Britain | 52/79 |
| 1,023,144 | 3/1966 | Great Britain | 52/64 |

Primary Examiner—Frank L. Abbott
Assistant Examiner—Leslie A. Braun
Attorney—Harry B. Keck and George E. Manias

[57] ABSTRACT

An aircraft hangar for housing modern extremely large aircraft, such as, the Boeing 747, the Boeing 747 extended and the Lockheed 1011. The hangar comprises a central, static building unit and two movable building units including guide means for establishing the locus of movement of the two building units along intersecting lines. The movable building units are separated. The central, static building unit receives the tail section and a portion of the fuselage of an aircraft. The movable units are brought together and enclose the wings and the remainder of the fuselage.

3 Claims, 10 Drawing Figures

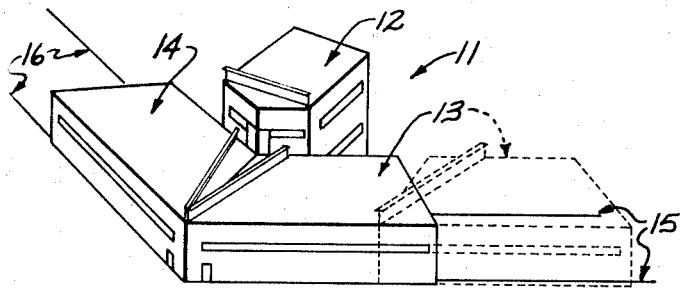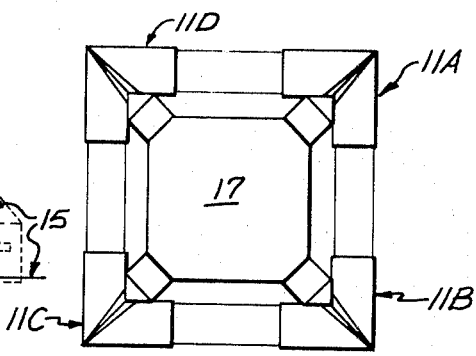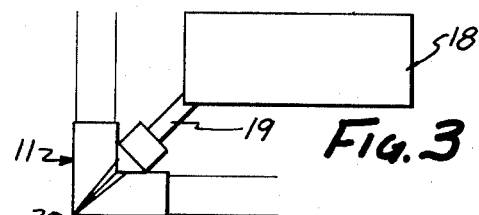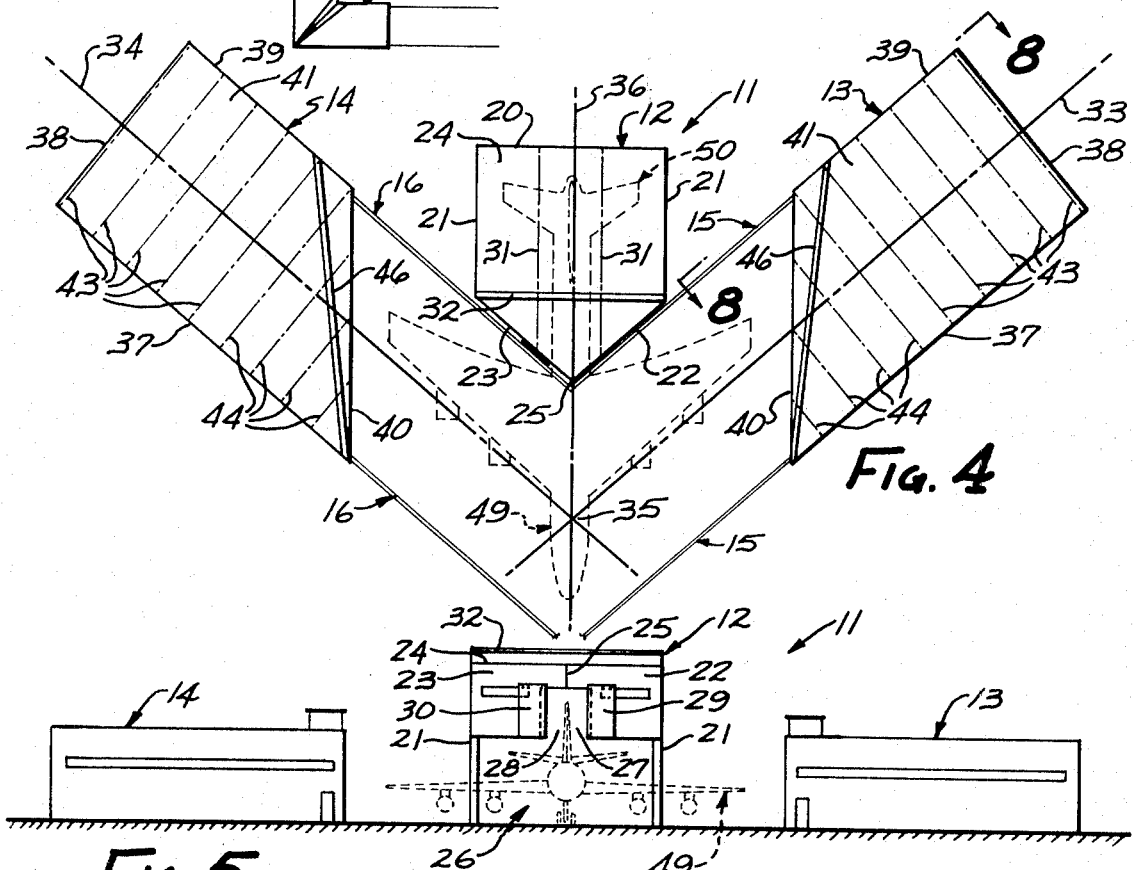

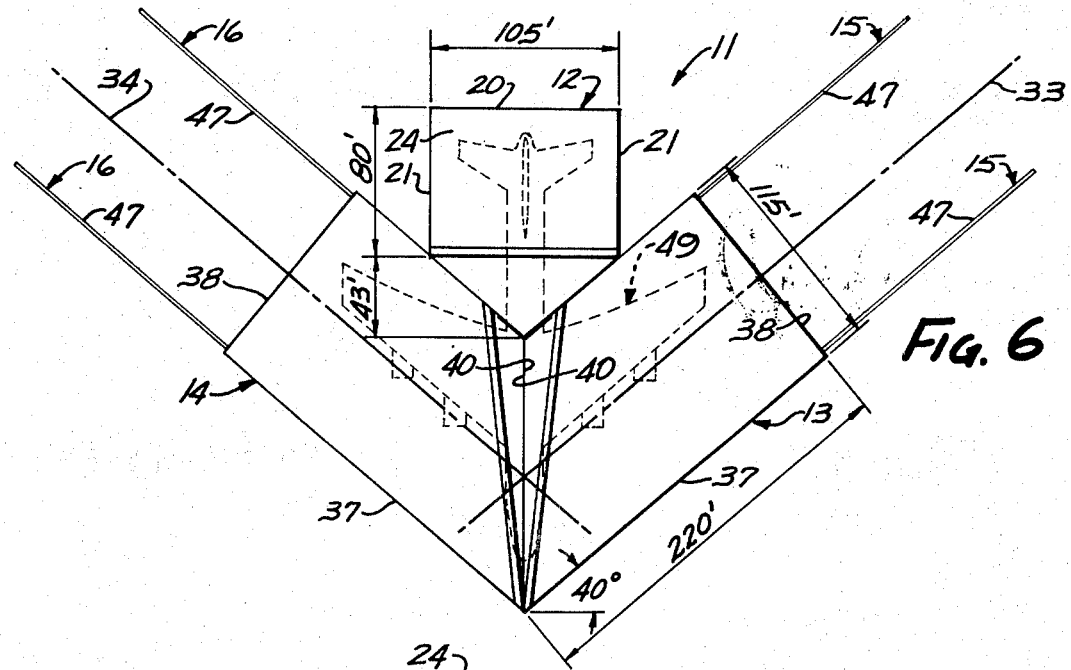
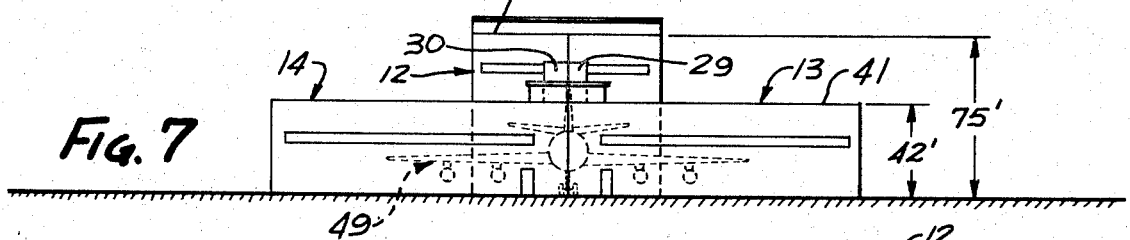
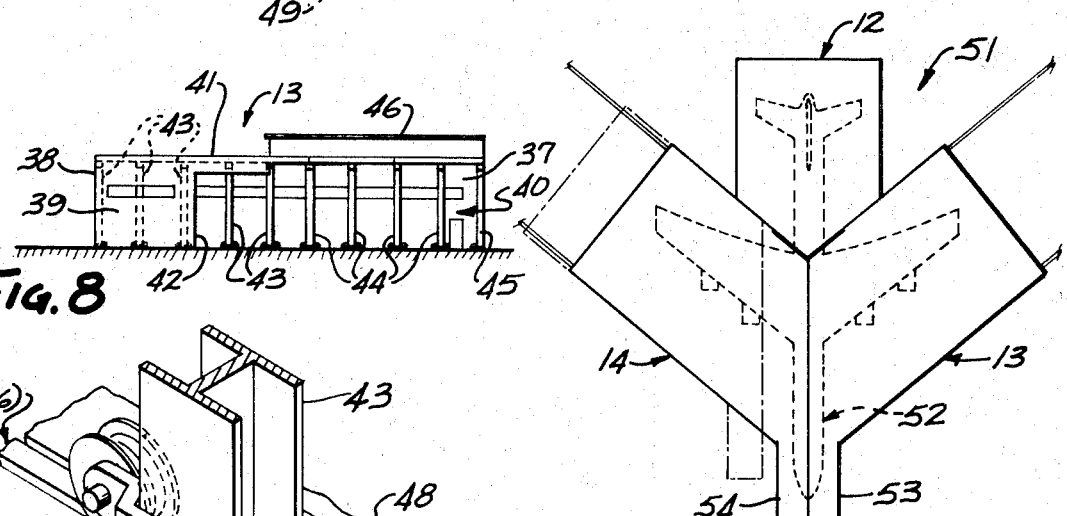
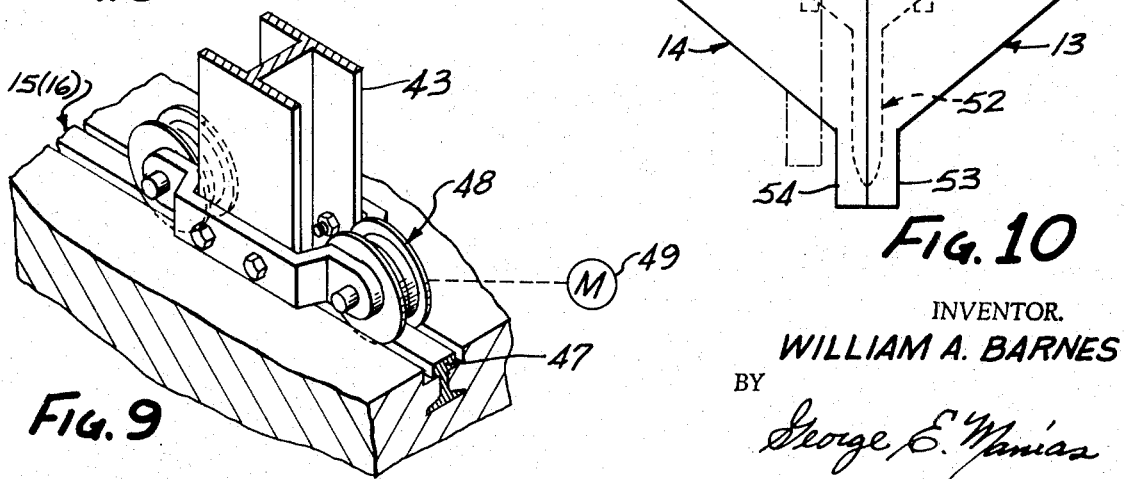
INVENTOR.
WILLIAM A. BARNES

3,739,537

AIRCRAFT HANGAR

BACKGROUND OF THE INVENTION

1. Field of the Invention:

This invention relates to an aircraft hangar, and more particularly to an improved aircraft hangar adapted to enclose the modern "jumbo jet".

2. Description of the Prior Art:

The prior art contains several examples of aircraft hangars employing at least two movable building components. One such prior art hangar comprises two complementary building components each of which is pie-shaped. The building components are mobile and serve to enclose the wings and body portion of an airplane with a minimum of confined cubage. The trail section is not enclosed by this hangar. See U. S. Pat. No. 2,652,906 issued Sept. 22, 1953 to John L. Mitchell.

Another prior art hangar comprises a three component building having a fixed center portion which is adapted to extend over the entire fuselage and the tail section of the airplane. Two mobile building units are mounted on common tracks for rectilinear movement toward and away from each other and the fixed center section. The mobile sections are adapted to enclose the wings of an aircraft. See U. S. Pat. No. 2,992,709 issued July 18, 1961 to James C. McIntosh.

A further prior art hangar comprises a three component building including a main body composed of a wing section and a tail section arranged at right angles to each other and a pair of mobile rounded or arcuately-shaped doors mounted on a common rail for rectilinear movement toward and away from each other. See U. S. Pat. No. 3,034,607 issued May 15, 1962 to Willits P. Haines, Jr.

The hangars of the foregoing cited patents are intended to house smaller size aircraft, such as, the Piper Cub, the twin engine Beechcraft and other relatively small commercial aircraft.

At present, several commercial airlines employ the Boeing 747 — jumbo jet — as a regular carrier.

Jumbo jets are extremely large aircraft. For example, the Boeing 747 has a length of 229 feet, 2 inches, a wing span of 195 feet, 8 inches, and a 63 feet, 5 inch high tail. The Lockheed 1011 has a length of 177 feet, 2 inches, a wing span of 155 feet, 4 inches, and a 55 feet high tail.

The advent of the "jumbo jet" has created a need for new and extremely large hangars in which the "jumbo jet" is housed for routine maintenance work and emergency service. At present, conventional hangar designs are under consideration, that is, hangar designs very similar to the existing hangar designs which were developed to accommodate smaller aircraft. The present designs include large hangar bays with adjoining multi-story office buildings.

A better appreciation of the sizes involved can be gained from the following statistics. A two bay hangar for housing two jumbo jets, has an overall height from 90 to 110 feet, a length from 275 to 285 feet, and a bay width from 244 to 292 feet. Such large bay widths dictate the use of deep trusses, that is trusses having a height of from 25 to 30 feet. Moreover, each bay includes an operating hangar door which is 50 to 80 feet high and 225 to 270 feet long. Each bay has an interior space equal to 6.5 to 9 million cubic feet.

A proposed four bay hangar has an overall height of 120 feet, of which 40 feet correspond to the height of a high strength steel cable roof support; a width of 448 feet and a length of 550 feet. Each bay includes a door which is approximately 80 feet high and 220 feet long. Each bay has an area of approximately 61,600 square feet and an interior space of 6.2 million cubic feet.

The dimensions of the "jumbo jet" hangars and those under construction is indeed staggering.

SUMMARY OF THE INVENTION

The principal object of this invention is to provide an improved hangar for enclosing a "jumbo jet" with a diminished cubage.

Another object of this invention is to provide an improved hangar wherein large operating hangar doors are eliminated.

Still another object of this invention is to provide an improved hangar having a reduced overall height and a diminished effect on instrument landing systems.

A further object of this invention is to provide an improved hangar which may be quickly erected; which is easily expanded to accommodate still larger "jumbo jets", which requires less heating, maintenance and the like.

In accordance with the present invention, an aircraft hangar is provided comprising a three component structure. The aircraft hangar includes a central, static building unit having forward openings and which is tall enough to receive the tail section of a "jumbo jet". Two movable building units are provided for enclosing the wings and a major portion of the fuselage of the "jumbo jet". Since the two movable building units enclose only the wings and fuselage of the aircraft, the height of the two movable building units is considerably less than the height of the central, static building unit. A pair of guide means is provided, one each for the two movable building units for establishing a locus of movement of the two movable building units along intersecting lines, that is, parallel to the swept back wings of the "jumbo jet". Each of the two movable building units is provided with means for moving the unit along the guide means between (a) spaced-apart locations wherein the forward openings of the central, static building unit are exposed, and (b) adjacent locations wherein the confronting open ends of the two movable building units are engaged and enclose the forward openings in the central, static building unit. The central, static building unit also is provided with upper contiguous openings presented above the roof line of the two movable building units through which the tail of the "jumbo jet" is received. Door means are mounted on the static building unit for movement between open and closed positions relative to the aforesaid upper contiguous openings.

BRIEF DESCRIPTION OF THE DRAWINGS

FIG. 1 is a perspective view illustrating the present aircraft hangar;

FIG. 2 is a plan view of a cluster of the present aircraft hangars arranged about a central service building;

FIG. 3 is a plan view illustrating the present hangar positioned as an extension of an existing service building;

FIG. 4 is a plan view of the present aircraft hangar illustrating the two movable building units in spaced-apart locations;

FIG. 5 is a front elevation view of the present hangar illustrated in FIG. 4;

FIG. 6 is a plan view of the present hangar with the two movable building units in adjacent locations;

FIG. 7 is a front elevation view of the present hangar illustrated in FIG. 6;

FIG. 8 is a side view of one of the two movable building units, as viewed from the line 8—8 of FIG. 4;

FIG. 9 is a fragmentary perspective view of a suitable guide means for establishing the locus of movement of the two movable building units; and FIG. 10 is a plan view, similar to FIG. 6, illustrating an alternative embodiment of the present aircraft hangar adapted to enclose a larger "jumbo jet".

DESCRIPTION OF THE PREFERRED EMBODIMENT

FIG. 1 illustrates an aircraft hangar 11 of this invention. The hangar 11 includes a central, static building unit 12 and two movable building units 13, 14. Guide means 15, 16 is provided for the movable building units 13, 14 respectively, for establishing the locus of movement of the movable building units 13, 14. Drive means, not illustrated in FIG. 1, is provided for moving each of the movable building units 13, 14 between spaced-apart locations — the building unit 13 being illustrated in dotted outline at one of the said spaced-apart locations — and adjacent locations illustrated in full outline, wherein the building units 13, 14 are united to form an integral structure.

A plurality of the present aircraft hangars may be arranged in a cluster. For example, FIG. 2 illustrates a cluster comprising four of the present aircraft hangars 11A, 11B, 11C and 11D arranged in a square pattern. Each of the aircraft hangars 11A–11D is presented at one of the four corners of a central building 17 which may comprise a multi-story building housing offices and maintenance shops.

Alternatively, as illustrated in FIG. 3, the present aircraft hangar 11 may be positioned adjacent to an existing service building 18 and connected therewith by a service corridor 19.

Referring to FIGS. 4 and 5, the central, static building unit 12 includes a rear wall 20 and side walls 21 all of which extend from ground level to the level of the roof 24. The central, static building unit 12 also includes two forward walls 22, 23 which converge from the forward edges of the side walls 21 to a vertical line 25. The static building unit 12 includes a forward opening 26 whose upper extent is defined by the lower edge of the forward walls 22, 23. Contiguous openings 27, 28 are provided in the forward walls 22, 23 on opposite sides of the vertical line 25. Door means 29, 30 are mounted on the forward walls 22, 23, for example for sliding movement between open and closed positions relative to the contiguous openings 27, 28.

As best shown in FIG. 4, the central, static building unit 12 may include main rigid frame members or trusses indicated by the dash-dot line 31. An up set truss 32 spans the distance between the forward upper corners of the side walls 21 and supports the forward ends of the main trusses 31. It should be understood that other suitable designs may be employed in constructing the static building unit 12.

Referring still to FIGS. 4 and 5, the guide means 15, 16 establish the locus of movement of the two movable building units 13, 14 along intersecting lines corresponding, for example, to the longitudinal axes 33, 34 of the movable building units 13, 14. It is to be noted in FIG. 4, that the lines 33, 34 intersect at a point 35 which is disposed forwardly of the central, static building unit 12 and which coincides with the longitudinal axis 36 of the central, static building unit 12.

The configuration and a suitable construction of the movable building unit 13 will now be described with reference to FIGS. 4 and 8. It is to be understood that the following description applies equally to the movable building unit 14.

The movable building unit 13 includes a forward wall 37, an end wall 38, a rear wall 39 opposite the forward wall 37, an open end 40 opposite the end wall 38, and a roof 41. The rear wall 39 is provided with an opening 42 (FIG. 8) corresponding essentially to one half of the forward opening 26 (FIG. 5) of the central, static building unit 12. It is to be noted that sufficient overlap is provided at the periphery of the opening 42 for the purpose of sealing the area of contact between the rear wall 39 and the forward wall 22 of the central, static building unit 12.

The movable building unit 13 may include a plurality of inverted U-shaped main rigid frames or trusses 43 extending transversely of the unit 13. The trusses 43 have segments parallel with the roof 41, and the front and rear walls 37, 39. Additionally, the unit 13 includes L-shaped rigid frames or trusses 44 having vertical segments parallel with the front wall 37 and horizontal segments parallel with the roof 41. A corner column 45 (FIG. 8) may be provided at the corner at which the forward wall 37 terminates. An up set truss 46 spans the distance between the upper end of the corner column 45 and that upper end of the main truss 43 adjacent to the rear wall 39. The L-shaped frames or trusses 44 have their horizontal components rigidly secured to and supported by the up set truss 46. Wall and roof purlins (not visible) and siding and roofing materials constituting the walls 37–39 and roof 41 are secured to the trusses 43, 44 and the corner column 45. It is to be noted that the above described design is but one of many designs which may be employed in the construction of the movable building units 13, 14.

In order to gain some idea of the size of the present aircraft hangar 11, all pertinent dimensions of the building units 12, 13, 14 are indicated at FIGS. 6 and 7. These dimensions correspond to one contemplated design of the present aircraft hangar 11. For the purpose of comparison, the present aircraft hangar 11 having the dimensions indicated in FIGS. 6 and 7, would have a floor area of approximately 48,000 square feet and an enclosed cubage or volume of approximately 2.37 million cubic feet. Compared to the prior art hangars for "jumbo jets" described above, the present aircraft hangar 11 has an area which ranges from 22 to 41 percent less than the area of the prior art hangars and a cubage which varies from 61 to 73 percent less than the cubage of the prior art hangars.

It will be observed in FIG. 6, that each of the guide means 15, 16 may comprise a pair of parallel tracks 47. As shown in FIG. 9, each of the tracks 47 is recessed in the ground so that its upper surface is flush with the level of the ground. Each of the main trusses 43 may be supported for movement along the track 47 by a wheel assembly 48. Drive means, for example in the form of a motor schematically illustrated at 49 is provided for moving each of the movable building units 13, 14 along the guide means 15, 16, respectively.

In FIGS. 4 and 5, the movable building units 13, 14 have been separated and reside in spaced-apart locations. The door means 29, 30 have been separated to expose the contiguous openings 27, 28. An aircraft 49 is illustrated in dotted outline. The aircraft 49 corresponds to the Boeing 747. A conventional airplane tractor (not illustrated) may be employed to move the aircraft 49, tail first, between the movable sections 13, 14 to position the tail section 50 within the central, static building unit 12. Note, in FIG. 5 that the rudder of the tail section passes through the contiguous openings 27, 28. Once the aircraft 49 has been moved to the position indicated in dotted outline in FIG. 4, the movable building units 13, 14 are moved toward each other along the guide means 15, 16. FIGS. 6 and 7 illustrate the adjacent positions of the building units 13, 14 wherein the confronting open ends 40 thereof are engaged and wherein the forward opening 26 (FIG. 5) is enclosed by the movable building units 13, 14. The door means 29, 30 are moved to the closed position. It will be noted in FIGS. 6 and 7 that the aircraft 49 is completely enclosed within the aircraft hangar 11. Routine maintenance operations or emergency repairs may be conducted within the aircraft hangar 11.

An alternative arrangement of the present aircraft hangar is illustrated in FIG. 10 and designated generally by the numeral 51. The hangar 51 is adapted to enclose an aircraft 52 which may, for example, correspond to the Boeing 747 extended. The hangar 51 comprises a modified version of the hangar 11 of FIG. 6. The modifications include increasing the length of the central, static building unit 12 to accept the longer tail section; increasing the longitudinal length of each of the movable building units 13, 14 to accept the increased wing span of the aircraft 52; and the addition of extensions 53, 54 to the movable building units 13, 14 respectively, to accept the longer fuselage of the aircraft 52.

I claim:

1. In an aircraft hangar, a three component structure comprising a central, static building unit having a forward opening and two movable building units presenting confronting open ends, each of the said two movable building units being distinct from the said central, static building unit and providing a three sided enclosure; a pair of guide means, one each for the said two movable building units for establishing a locus of movement for the said two movable building units along intersecting lines which intersect at a point which is disposed forwardly of the said central, static building unit and which coincides with the longitudinal axis of the said central, static building unit; the said central, static building unit includes two front walls each parallel with one of the said intersecting lines and meeting along a vertical line; and means for moving the said two movable building units along the said intersecting lines between (a) spaced-apart locations wherein the said forward opening of the said central, static building unit is exposed, and (b) adjacent locations wherein the said confronting open ends are engaged and enclose the said forward opening.

2. The aircraft hangar of claim 1 wherein the said two front walls commence essentially at the level of the roof line of the said two movable building units and extend thereabove, the lower edges of the said two front walls defining the upper extent of the said forward opening.

3. The aircraft hangar of claim 1 wherein the said two front walls have contiguous openings on opposite sides of the said vertical line; and door means mounted on said front walls for movement between open and closed positions relative to the said contiguous openings.

* * * * *